(12) United States Patent
Nakamura et al.

(10) Patent No.: US 7,971,580 B2
(45) Date of Patent: Jul. 5, 2011

(54) CONTROL DEVICE FOR INTERNAL COMBUSTION ENGINE AND STRADDLE TYPE VEHICLE PROVIDED WITH THE SAME

(75) Inventors: Michihisa Nakamura, Shizuoka (JP); Michiyasu Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 470 days.

(21) Appl. No.: 12/211,692

(22) Filed: Sep. 16, 2008

(65) Prior Publication Data

US 2009/0076706 A1 Mar. 19, 2009

(30) Foreign Application Priority Data

Sep. 18, 2007 (JP) ................... 2007-241202

(51) Int. Cl.
*F02B 13/06* (2006.01)
(52) U.S. Cl. ............... 123/575; 123/1 A; 123/179.3; 123/179.18; 701/102; 701/104; 701/103
(58) Field of Classification Search ........... 701/103, 701/102; 123/1 A, 575, 179.16, 179.18, 123/304, 491, 685–588, 699, 700
See application file for complete search history.

(56) References Cited

U.S. PATENT DOCUMENTS

| | | | |
|---|---|---|---|
| 4,706,629 A | 11/1987 | Wineland et al. | |
| 5,090,389 A * | 2/1992 | Oota | 123/685 |
| 5,301,648 A | 4/1994 | Uchinami | |
| 6,718,941 B2 * | 4/2004 | Asano et al. | 123/339.23 |
| 7,093,426 B2 * | 8/2006 | Ichihara et al. | 60/285 |
| 7,523,744 B2 * | 4/2009 | Ayame | 123/491 |
| 2004/0162667 A1 * | 8/2004 | Abe et al. | 701/109 |
| 2007/0119391 A1 * | 5/2007 | Fried et al. | 123/25 A |
| 2007/0119416 A1 * | 5/2007 | Boyarski | 123/304 |
| 2008/0035106 A1 * | 2/2008 | Stein | 123/304 |

FOREIGN PATENT DOCUMENTS

| | | |
|---|---|---|
| JP | 62-054987 | 11/1987 |
| JP | 62054987 B2 | 11/1987 |

OTHER PUBLICATIONS

European search report for corresponding European application 08253041.1-2311 lists the references above.

* cited by examiner

*Primary Examiner* — Michael Cuff
*Assistant Examiner* — Long Tran
(74) *Attorney, Agent, or Firm* — Keating & Bennett, LLP (57) ABSTRACT

Startability of an internal combustion engine using a mixed fuel of gasoline and alcohol is improved. An intake passage of the engine has a main flow channel provided with a throttle valve and a bypass flow channel for bypassing the throttle valve. A bypass quantity adjusting mechanism adjusts the bypass quantity in the bypass flow channel. A control device detects or estimates the mixing ratio of alcohol of the fuel and controls the bypass quantity adjusting mechanism so that a bypass quantity before a first explosion is smaller than a bypass quantity after the first explosion when the mixing ratio of alcohol is equal to or more than a predetermined value.

17 Claims, 11 Drawing Sheets

CONTROL DEVICE FOR INTERNAL COMBUSTION ENGINE AND STRADDLE TYPE VEHICLE PROVIDED WITH THE SAME

RELATED APPLICATIONS

This application claims the benefit of priority under 35 USC 119 of Japanese patent application no. 2007-241202, filed on Sep. 18, 2007, which is hereby incorporated by reference.

BACKGROUND OF THE INVENTION

1. Field of the Invention

The present invention relates to a control device for an internal combustion engine of a straddle type vehicle.

2. Description of Related Art

An internal combustion engine using a mixed fuel formed by mixing gasoline and alcohol is known. An engine using the mixed fuel has a problem in that an increase in the mixing ratio of alcohol in the mixed fuel causes deterioration in the warming-up performance of the engine.

In view of the above, JP-B-62-54987 discloses a fuel supply device for improving the warming-up performance of the internal combustion engine. JP-B-62-54987 describes a control for enriching (lowering) an air fuel ratio by reducing the opening of the choke valve when the alcohol concentration is equal to or more than a predetermined value after a complete explosion in a fuel supply device of an engine. The control comprises an alcohol concentration sensor, a choke valve and a carburetor including a complete explosion correcting mechanism for opening the choke valve by a fixed opening after a complete explosion (namely, after a first explosion).

The control described in JP-B-62-54987 is control after the first explosion for the purpose of improving warming-up performance. In an internal combustion engine using mixed fuel, however, the mixed fuel decreases in volatility when the mixing ratio of alcohol is high, which sometimes causes difficulty in achieving an excellent first explosion. That is, there is a problem in that the startability of the internal combustion engine is deteriorated.

SUMMARY OF THE INVENTION

The present invention addresses these problems and improves startability of an internal combustion engine using a mixed fuel formed by mixing gasoline and alcohol.

A control device for an internal combustion engine in accordance with the invention includes an intake passage having a main flow channel provided with a throttle valve and a bypass flow channel for communicating an upstream side of the throttle valve in the main flow channel with a downstream side of the throttle valve, and a fuel injection valve that injects a mixed fuel of gasoline and alcohol. The control device includes a mixing ratio determining means for detecting or estimating the mixing ratio of alcohol. A storing means stores the detected or estimated mixing ratio of alcohol. A bypass quantity varying means varies a bypass quantity of air flowing in the bypass flow channel. A bypass control means controls the bypass quantity varying means so that the bypass quantity before the first explosion is less than the bypass quantity after the first explosion when the mixing ratio of alcohol stored in the storing means is a predetermined value or more.

A high mixing ratio of alcohol in a fuel causes a reduction in volatility. In accordance with the control device of the invention, however, the bypass amount before the first explosion is smaller than the bypass amount after the first explosion when the mixing ratio of alcohol is high, so that an air fuel ratio is enriched. This allows an excellent first explosion to be achieved, and startability of the internal combustion engine is thereby improved.

In accordance with the invention, the startability of an internal combustion engine using a mixed fuel of gasoline and alcohol is improved.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
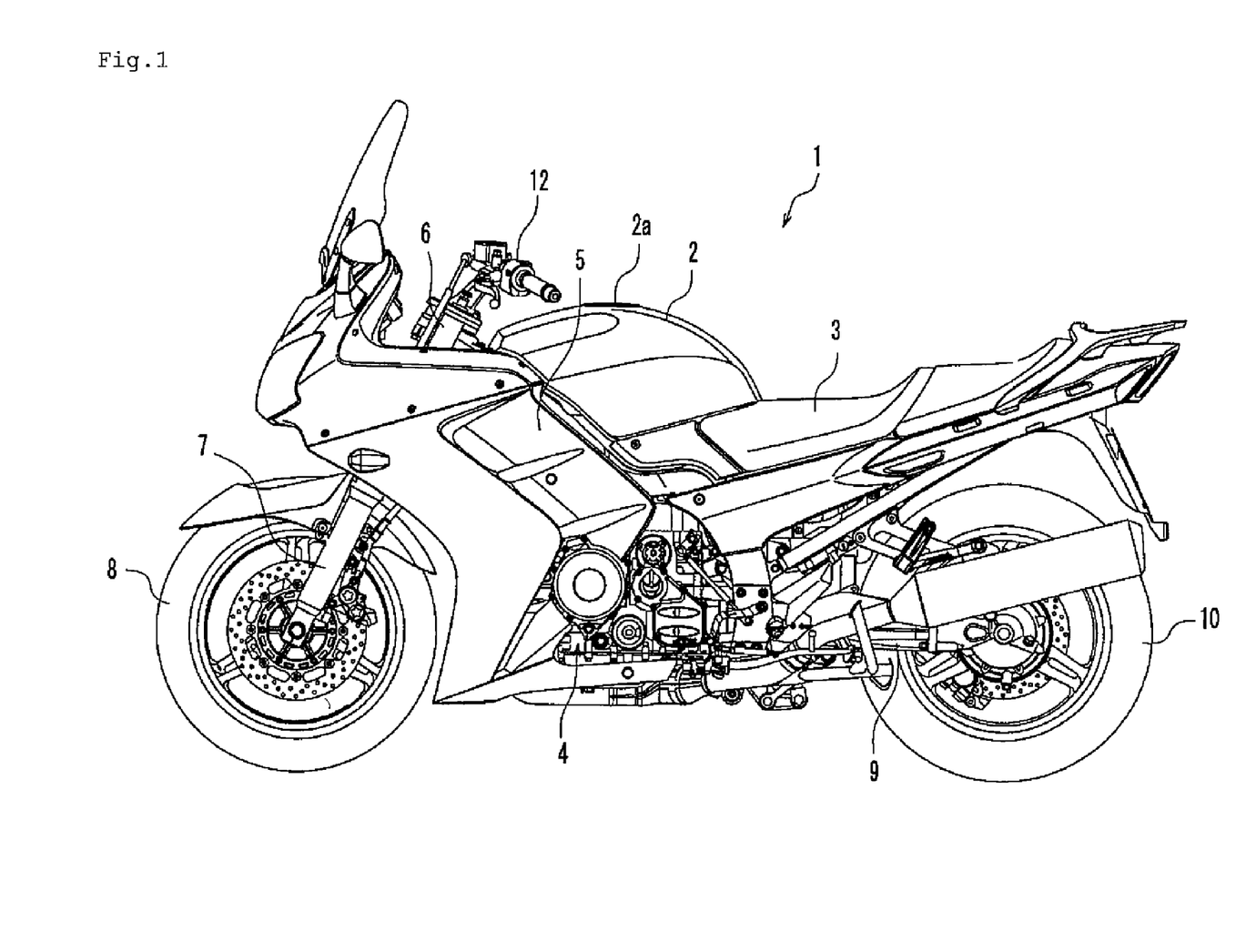
FIG. 1 is a side view of a motorcycle.

As shown in FIG. 1, a motorcycle 1 is an embodiment of a straddle type vehicle in accordance with the invention. Motorcycle 1 may be of any type including a motorcycle, a scooter, a moped, a motorbike and such. Further, a straddle type vehicle in accordance with the invention may be any vehicle that is straddled by a rider or an equivalent vehicle and includes a motorcycle, an ATV (all terrain vehicle) and such.

Motorcycle 1 can use gasoline, alcohol such as ethanol and a mixed fuel of gasoline and alcohol, as fuel. In the following description, ethanol is used as an example of alcohol.

<<Structure of Motorcycle>>

Motorcycle 1 comprises a body frame 5 holding a fuel tank 2, a riding seat 3 and an engine 4, as shown in FIG. 1. Fuel tank 2 includes a lid 2a. A head pipe 6 is provided on a front side of body frame 5. A steering shaft is held on head pipe 6. A handle 12 is provided on an upper part of the steering shaft. A front fork 7 is provided on a lower part of the steering shaft. A front wheel 8 is held on a lower end part of front fork 7 so as to be freely rotatable. A swing arm 9 is held on body frame 5 so as to be freely swingable. A rear wheel 10 is held on a rear end part of swing arm 9 so as to be freely rotatable.

Figure 2:
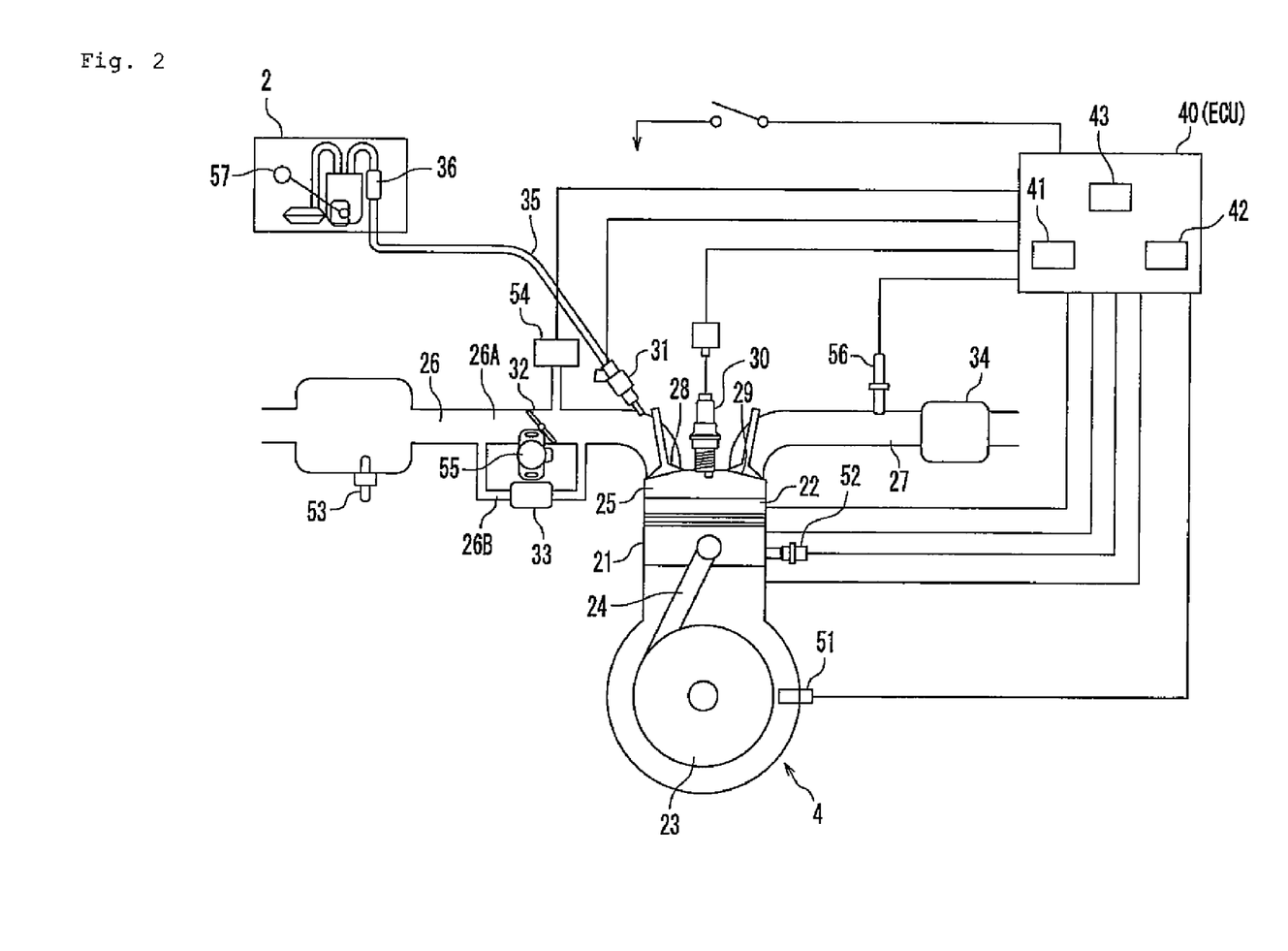
FIG. 2 is a diagram of an engine and a control device.

As shown in FIG. 2, engine 4 comprises a cylinder 21, a piston 22 reciprocating in cylinder 21, a crankshaft 23 and a con rod 24 connecting piston 22 and crankshaft 23. Engine 4 also comprises a fuel injection valve 31 for injecting fuel and an ignition unit 30 for carrying out ignition of the fuel in a combustion chamber 25. A speed sensor 51 detects the number of rotations of crankshaft 23 and a temperature sensor 52 detects the temperature of engine 4. Temperature sensor 52 may detect the temperature of a part of engine 4 (a cylinder, for example) and, if engine 4 is a water cooling type, may detect the temperature of cooling water. That is, temperature sensor 52 may directly detect the temperature of engine 4 or indirectly detect the temperature through cooling water or the like.

Engine 4 includes an intake passage 26 for introducing air into combustion chamber 25, an intake valve 28 for opening and closing between intake passage 26 and combustion chamber 25, an exhaust passage 27 for exhausting exhaust gas from combustion chamber 25 and an exhaust valve 29 for opening and closing between combustion chamber 25 and exhaust passage 27. Fuel injection valve 31 injects fuel into intake passage 26. Alternatively, fuel injection valve 31 may inject fuel into combustion chamber 25.

A temperature sensor 53 for detecting the temperature of intake air and a pressure sensor 54 for detecting the intake pressure inside intake passage 26 are provided in intake passage 26. Intake passage 26 includes a main passage 26A in which a throttle valve 32 is housed and a bypass passage 26B that communicates an upstream side of throttle valve 32 in main passage 26 with a downstream side of throttle valve 32. A throttle position sensor 55 detects an opening of throttle valve 32. A bypass quantity adjusting mechanism 33 in bypass passage 26B adjusts the area of the flow channel to control the bypass quantity of the air.

A catalyst 34 is provided in exhaust passage 27. An $O_2$ sensor 56 acting as an air fuel ratio sensor detects oxygen included in the exhaust gas in exhaust passage 27. Sensor 56 should be at least capable of detecting whether the air fuel ratio is on a rich side or on a lean side. Sensor 56 may also be a linear A/F sensor that linearly outputs the air fuel ratio (the air fuel ratio per se).

Fuel tank 2 and fuel injection valve 31 are connected by a fuel pipe 35. A fuel pump 36 for supplying fuel pipe 35 with fuel and a fuel sensor 57 for detecting the fuel quantity in fuel tank 2 are provided in fuel tank 2. The structure of fuel sensor 57 is not limited at all. A well-known sensor such as a liquid surface sensor, for example, may be properly used. In motorcycle 1, a mixing ratio of ethanol is estimated based on a value detected by $O_2$ sensor 56. Accordingly, no sensor is provided for detecting the concentration of ethanol in fuel tank 2. It is also possible, of course, to provide a sensor for directly detecting the concentration of ethanol of the fuel in fuel tank 2.

An ECU (electric control unit) 40 controls engine 4. ECU 40 includes an operation part 41 for executing various control operations and a storing part 42 for storing a control program for performing the control and various kinds of information. The structures of operation part 41 and storing part 42 are not limited at all. Operation part 41 may be a CPU, for example, and storing part 42 may be a ROM, a RAM or the like. Storing part 42 includes a non-volatile memory in this embodiment. ECU 40 also includes a mixing ratio determining part 43 for determining a mixing ratio of ethanol in the fuel. As described above the mixing ratio of ethanol is estimated based on a value detected by $O_2$ sensor 56. Mixing ratio determining part 43 executes the estimation to determine the mixing ratio of ethanol. If a sensor for directly detecting the concentration of ethanol in the fuel is provided, this sensor is used as mixing ratio determining part 43.

Detection signals are sent from the sensors described above to ECU 40. In particular, ECU 40 is connected to speed sensor 51, temperature sensor 52, temperature sensor 53, pressure sensor 54, throttle position sensor 55, $O_2$ sensor 56 and fuel sensor 57. If a sensor for directly detecting the concentration of ethanol in the fuel is provided, this sensor is also connected to ECU 40.

<<Bypass Quantity Adjusting Mechanism>>

A concrete example of bypass quantity adjusting mechanism 33 is now described. However, the structure of bypass quantity adjusting mechanism 33 is not limited at all.

(Step Motor Type Bypass Quantity Adjusting Mechanism)

Figure 3:
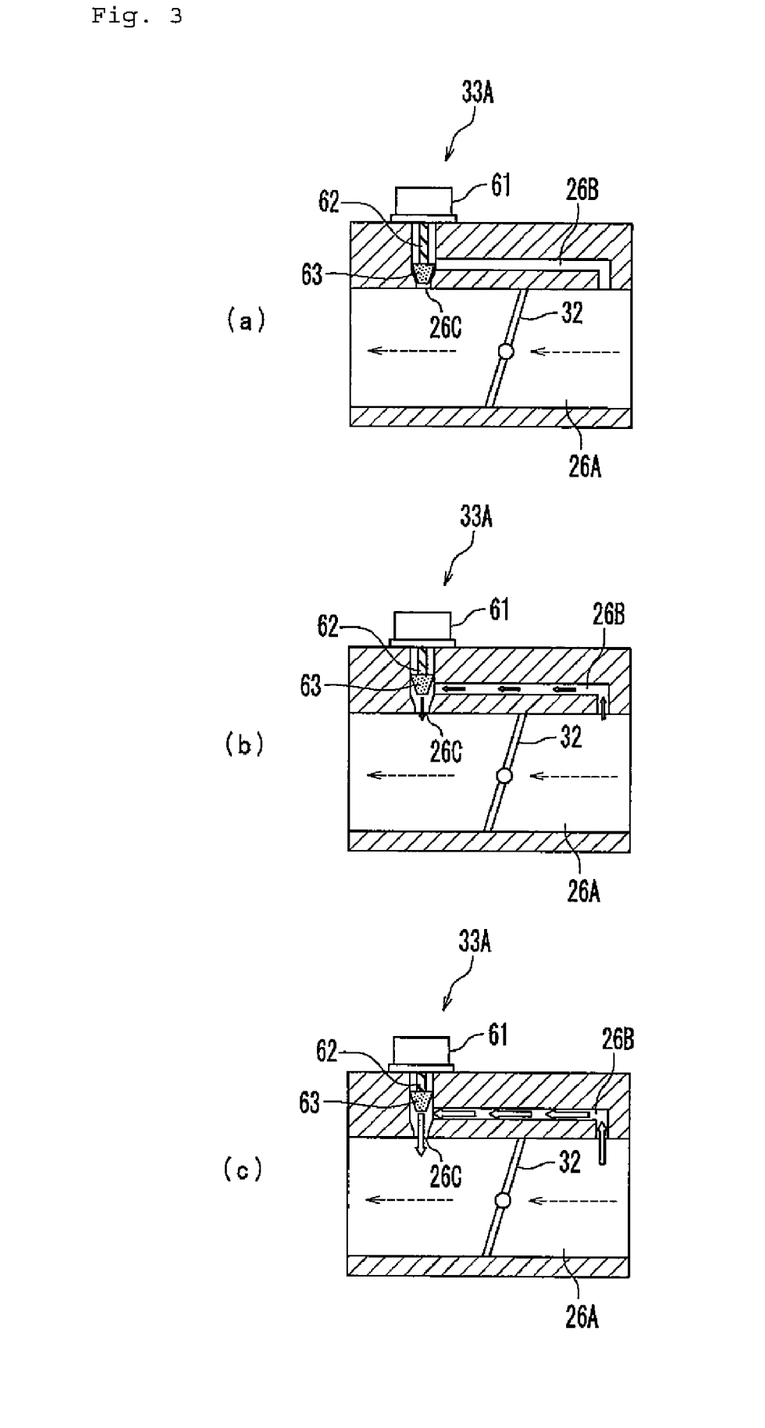
FIGS. 3(a)-3(c) are sectional views of a step motor type bypass quantity adjusting mechanism.

As shown in FIGS. 3(a)-3(c), bypass quantity adjusting mechanism 33 may be a step motor type bypass quantity adjusting mechanism 33A. Bypass quantity adjusting mechanism 33A includes a step motor 61, a shaft 62 driven by step motor 61 in the vertical direction in the drawings and a lid member 63 mounted to a top end of shaft 62. Lid member 63 moves in the vertical direction when shaft 62 is moved in the vertical direction by means of step motor 61 to open and close an exit 26C of bypass passage 26B. The area of the flow channel of bypass passage 26B is changed in accordance with the vertical position of lid member 63 to adjust the quantity of air flowing in bypass passage 26B. The position of lid member 63 may be freely adjusted, so that the quantity of air flowing in bypass passage 26B can be freely adjusted. FIG. 3(a) illustrates a state that lid member 63 is substantially fully closed (a substantially fully closing state). FIG. 3(b) illustrates a state that lid member 63 is half opened (a middle opening state). FIG. 3(c) illustrates a state that lid member 63 is fully opened (a fully opening state).

(Solenoid Type Bypass Quantity Adjusting Mechanism)

Figure 4:
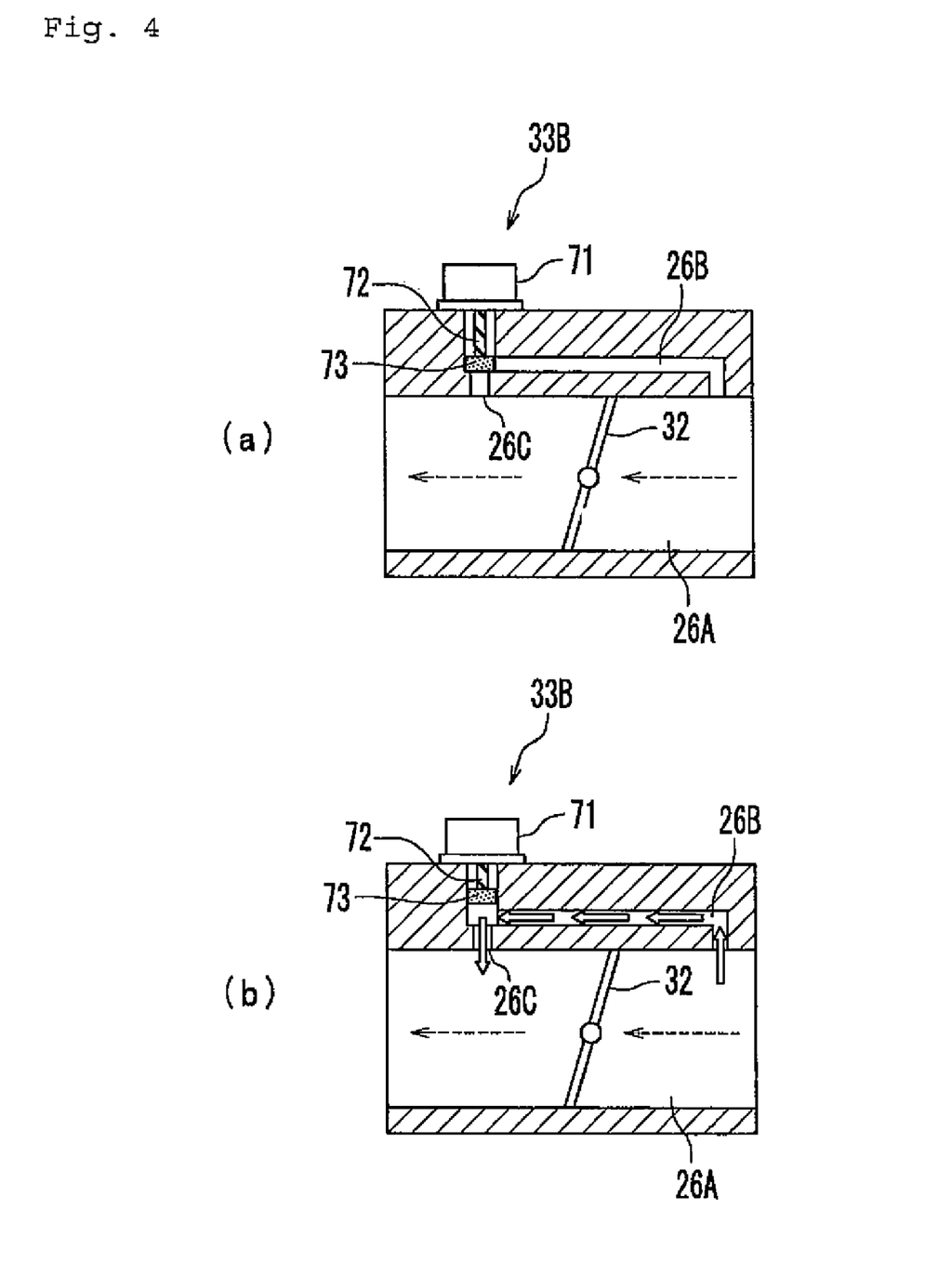
FIGS. 4(a)-4(b) are sectional views of a solenoid type bypass quantity adjusting mechanism.
Figure 5:
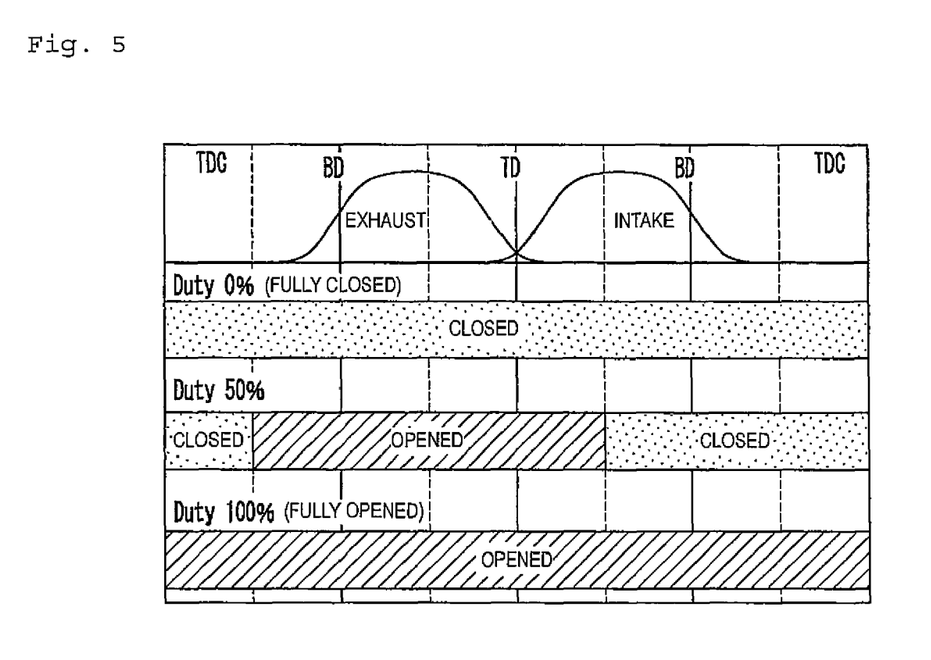
FIG. 5 is a timing chart showing duty control related to a solenoid type bypass quantity adjusting mechanism.

As shown in FIGS. 4(a)-4(b), a solenoid type bypass quantity adjusting mechanism 33B may also be used as bypass quantity adjusting mechanism 33. Bypass quantity adjusting mechanism 33B includes a solenoid 71, a shaft 72 driven by solenoid 71 in the vertical direction in the drawings and a lid member 73 mounted to a top end of shaft 72. Shaft 72 moves in the vertical direction in accordance with excitation of solenoid 71. Lid member 73 is raised and bypass passage 26B is opened when shaft 72 is raised. By contrast, a fall of shaft 72 by means of solenoid 71 causes lid member 73 to fall and closes bypass passage 26B. Properly adjusting a ratio (duty ratio) between the time when lid member 73 is in a raised position and the time when lid member 73 is in a descended position allows the quantity of air flowing in bypass passage 26B to be freely adjusted. FIG. 4(a) illustrates a state that bypass passage 26B is closed. FIG. 4(b) illustrates a state that bypass passage 26B is opened. FIG. 5 is a timing chart showing an example of duty control of bypass quantity adjusting mechanism 33B.

<<Engine Control>>

Engine control in accordance with this embodiment includes starting control carried out before and after starting engine 4 and regular control carried out after the starting control. The starting control is first described, and the regular control is then described.

—Starting Control—

Starting control can be roughly divided into control before the first explosion of engine 4 that is carried out before starting engine 4 and after a power source of motorcycle 1 is turned on, and control after the first explosion of engine 4 that is carried out after the start of engine 4. As described above, ECU 40 includes storing part 42 in which the mixing ratio of ethanol of the fuel before turning on the power source is stored. Concretely, storing part 42 stores the mixing ratio of ethanol at the preceding time that the power source is turned off.

(Control Before First Explosion)

Figure 6:
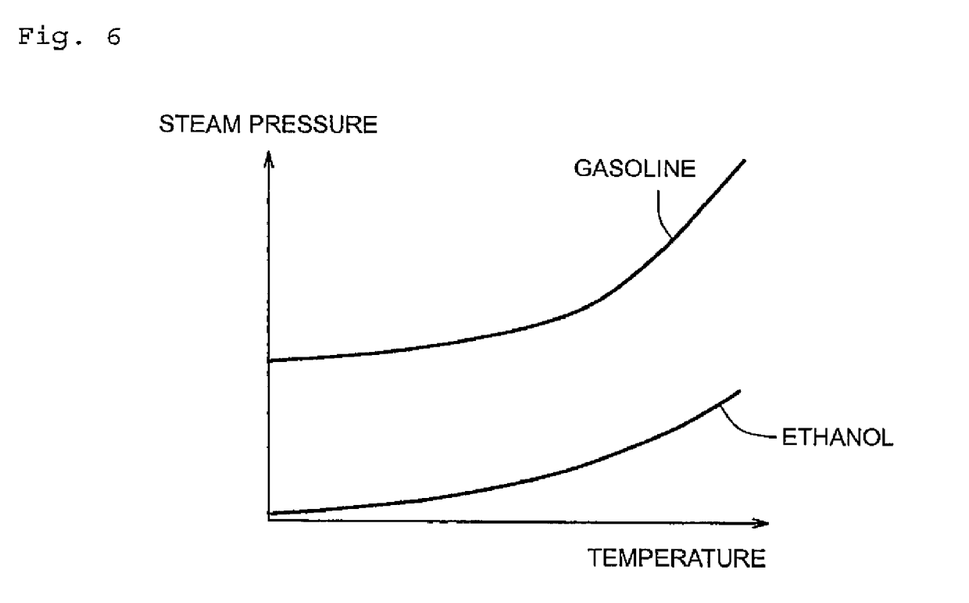
FIG. 6 is a graph illustrating steam pressure performance of gasoline and ethanol.

It is difficult in some cases to excellently perform the first explosion of engine 4 in accordance with conditions before the first explosion. That is, the first explosion is more difficult to be excellently carried out in the case that the mixing ratio of ethanol of the fuel is high than in the case that the mixing ratio of ethanol is low, due to a decrease in volatility of the fuel. Ethanol is lower in steam pressure than is gasoline, as shown in FIG. 6. Ethanol, however, is significantly larger in latent heat of evaporation than is gasoline. As a result, ethanol is lower in volatility than gasoline. This causes a decrease in volatility in the case of a high mixing ratio of ethanol of the fuel, so that the first explosion is difficult to be excellently carried out. Moreover, when the temperature of the engine is low, the volatility of the fuel is lower than when the temperature of the engine is high. This makes it difficult to achieve an excellent first explosion. Accordingly, in the control before the first explosion, the air fuel ratio is enriched to make the first explosion more easily performed when the volatility of the fuel is lower.

Figure 7:
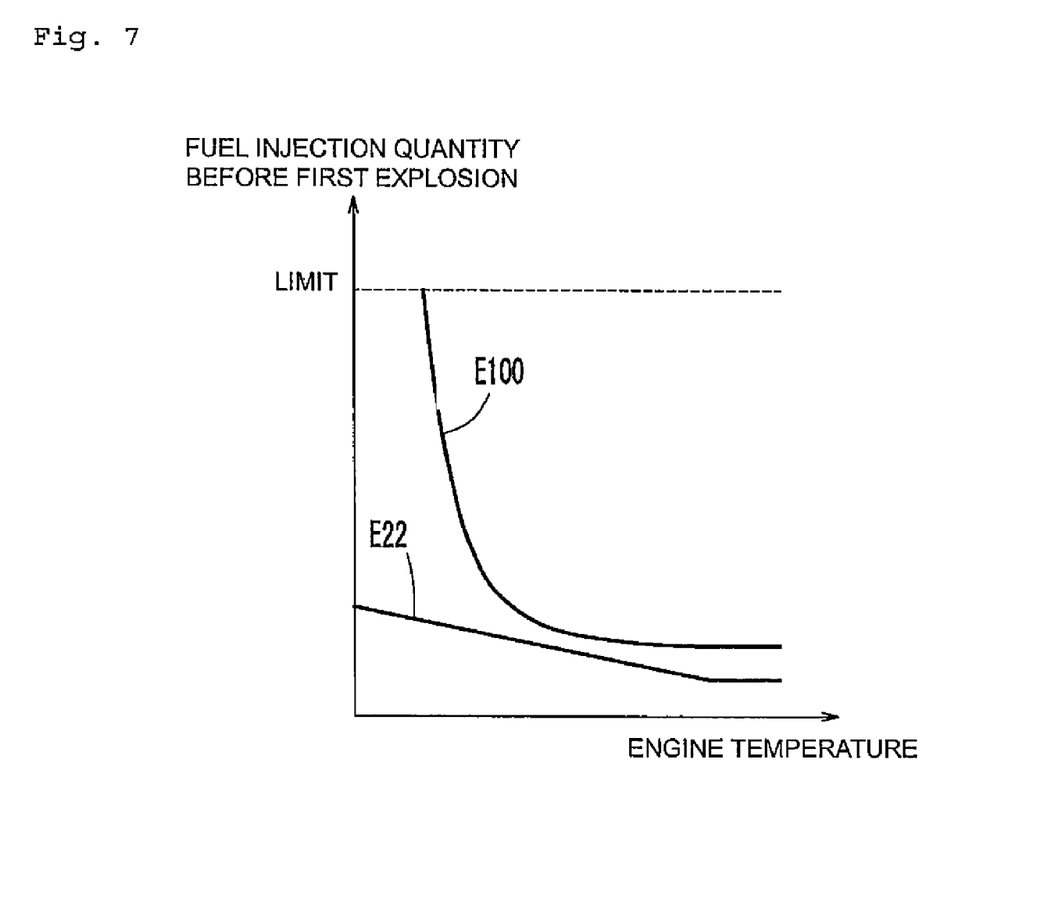
FIG. 7 is a graph illustrating fuel injection quantity in control before first explosion.

Concretely, as shown in FIG. 7, in the control before first explosion, fuel injection valve 31 is controlled so that the fuel injection quantity increases as the mixing ratio of ethanol of the fuel increases. In this regard, E100 in FIG. 7 denotes a fuel having a mixing ratio of ethanol of 100%, while E22 denotes a fuel having a mixing ratio of ethanol of 22%. Further, in the control before first explosion, fuel injection valve 31 is controlled so that the fuel injection quantity increases as the temperature of the engine decreases. The quantity of the fuel adhering to a wall surface of intake passage 26 is thereby increased in accordance with an increase in mixing ratio of ethanol or a decrease in temperature of the engine, and thereby, the quantity of the fuel capable of evaporation is increased. On the other hand, the quantity of the fuel adhering to the wall surface of the intake passage decreases when the mixing ratio of ethanol of the fuel is low or when the temperature of the engine is high, so that unnecessary fuel supply is suppressed.

Figure 8:
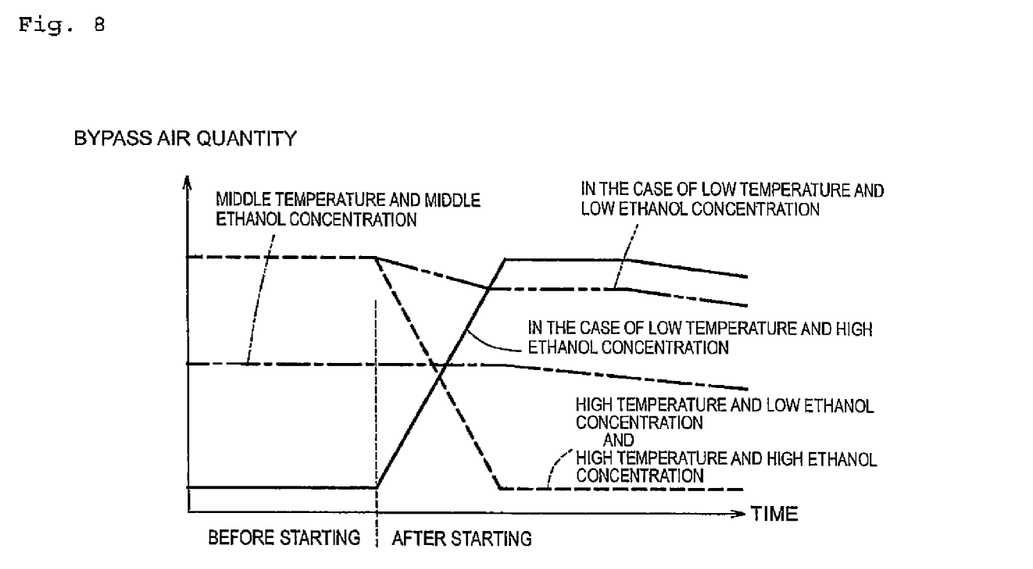
FIG. 8 is a graph illustrating a change in bypass quantity in starting control in accordance with passage of time.

Moreover, in the control before the first explosion, as shown in FIG. 8, bypass quantity adjusting mechanism 33 is controlled so that the bypass quantity of the intake air is decreased in accordance with an increase in mixing ratio of ethanol. Bypass quantity adjusting mechanism 33 may be controlled so that the bypass quantity of the intake air decreases in accordance with a decrease in temperature of the engine. This enriches the air fuel ratio. Furthermore, narrowing bypass passage 26B strengthens the flow in intake passage 26, thereby accelerating evaporation of fuel. On the other hand, the bypass quantity can be comparatively increased to suppress excessive enrichment of the air fuel ratio when the mixing ratio of ethanol is low or the temperature of the engine is high.

As shown by a solid line in FIG. 8, the bypass quantity before the first explosion is preferably reduced when the temperature of the engine at the time of starting is low and the mixing ratio of ethanol is high. In particular, bypass quantity adjusting mechanism 33 is preferably controlled so that the bypass quantity before the first explosion is smaller than the bypass quantity after the first explosion when the mixing ratio of ethanol is 60% or more and the temperature of the engine at the time of starting is lower than 20° C. The solid line in FIG. 8 illustrates a case that the mixing ratio of ethanol is 60% or more and the temperature of the engine at the time of starting is 15° C.

In this embodiment, carrying out such control before the first explosion enriches the air fuel ratio when the volatility of the fuel is low, so that the first explosion is more excellently performed. Accordingly, the startability of engine 4 is improved.

(Control After First Explosion)

Figure 9:
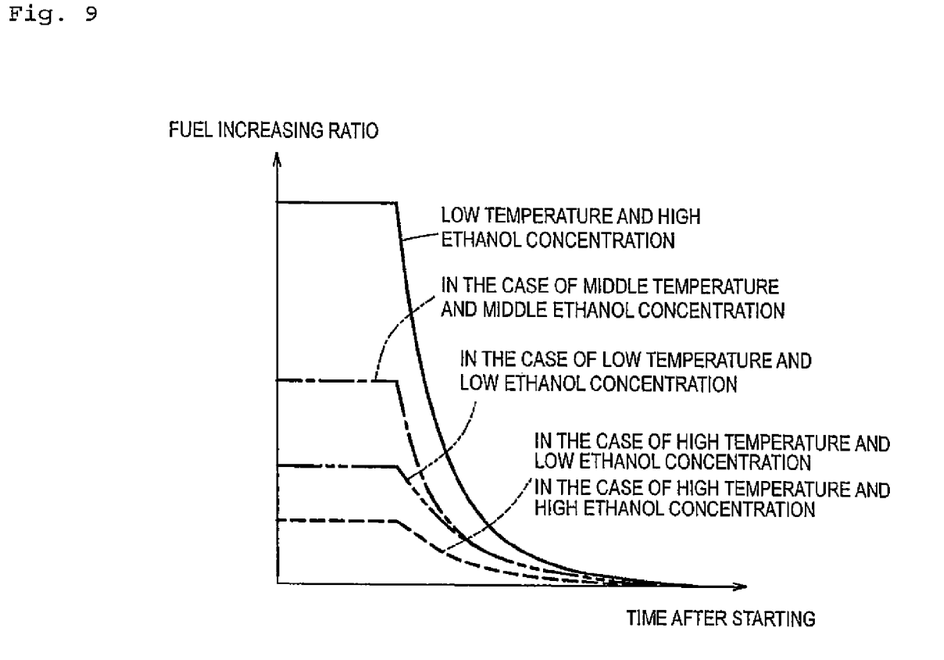
FIG. 9 is a graph illustrating a fuel increasing ratio in control after first explosion.

After the first explosion of engine 4, the temperature of engine 4 is preferably immediately raised. Accordingly, as shown in FIG. 9, fuel injection valve 31 is controlled so that a fuel increasing ratio of the fuel supply quantity is increased in accordance with an increase in the mixing ratio of ethanol in the control after the first explosion. Further, fuel injection valve 31 is controlled so that the fuel increasing ratio is increased in accordance with a decrease in temperature of the engine. This increases the quantity of fuel adhering to the wall surface of intake passage 26 when the mixing ratio of ethanol is high or the temperature of the engine is low, thereby increasing the quantity of fuel capable of evaporation. In order to suppress excessive supply of fuel after warming-up, the quantity of attenuation in fuel supply quantity per unit time when the mixing ratio of ethanol is high should be made equal to or larger than that when the mixing ratio of ethanol is low.

Moreover, after the first explosion, as shown in FIG. 8, bypass quantity adjusting mechanism 33 is controlled so that the bypass quantity of intake air is increased in accordance with a decrease in temperature of the engine. Further, bypass quantity adjusting mechanism 33 is controlled so that the bypass quantity of intake air is increased in accordance with an increase in mixing ratio of ethanol. The bypass quantity is preferably varied gradually and not rapidly before and after the first explosion. In this embodiment, the bypass quantity is not varied step by step before and after the first explosion, but is gradually varied at a fixed increasing or decreasing ratio.

In this embodiment, carrying out such control after the first explosion immediately raises the temperature of the engine, so that warming-up performance is improved.

As shown in FIG. 8, the bypass quantity before the first explosion is smaller than the bypass quantity after the first explosion when the mixing ratio of ethanol before the first explosion is high. On the other hand, the bypass quantity before the first explosion is larger than the bypass quantity after the first explosion when the mixing ratio of ethanol before the first explosion is low. That is, in the starting control of this embodiment, bypass quantity adjusting mechanism 33 is controlled so that the bypass quantity before the first explosion is smaller than the bypass quantity after the first explosion when the mixing ratio of ethanol before the first explosion is equal to or more than a predetermined value. The predetermined value is properly set in accordance with specifications of engine 4. The predetermined value is preferably 60% or more, for example, since engine 4 can be certainly started regardless of the engine temperature at the time of starting in this case.

Figure 11:
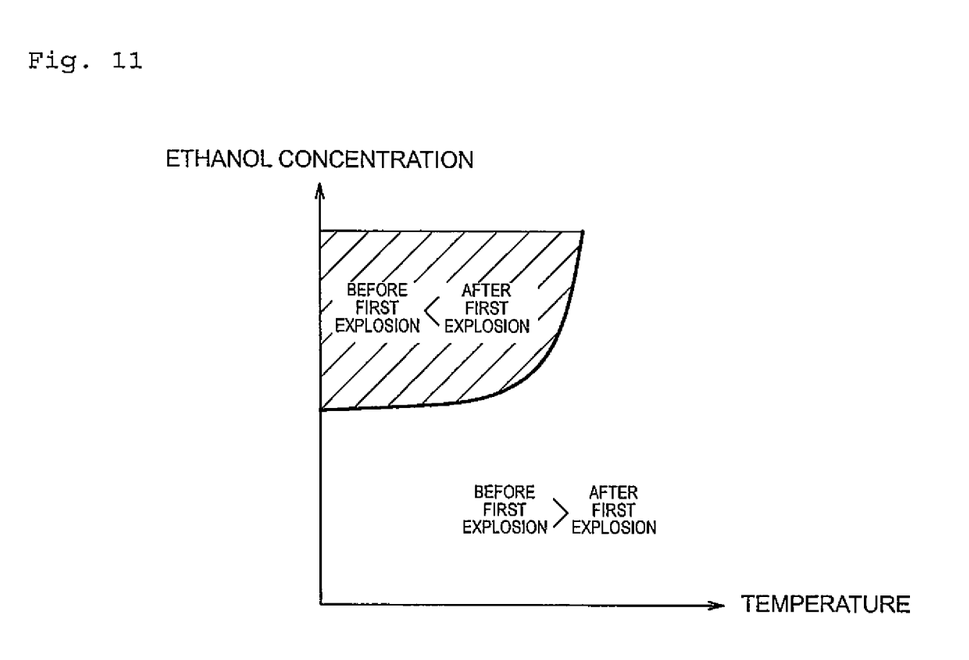
FIG. 11 is a graph illustrating how the engine temperature and the concentration of ethanol change the bypass quantity before and after first explosion.

Whether bypass quantity adjusting mechanism 33 is controlled so that the bypass quantity before the first explosion is smaller than the bypass quantity after the first explosion is determined in accordance with the temperature of the engine at the time of starting. As shown in FIG. 11, for example, bypass quantity adjusting mechanism 33 is controlled so that the bypass quantity before the first explosion is smaller than the bypass quantity after the first explosion in accordance with a decrease in temperature of the engine at the time of starting and an increase in the mixing ratio of ethanol.

Figure 10:
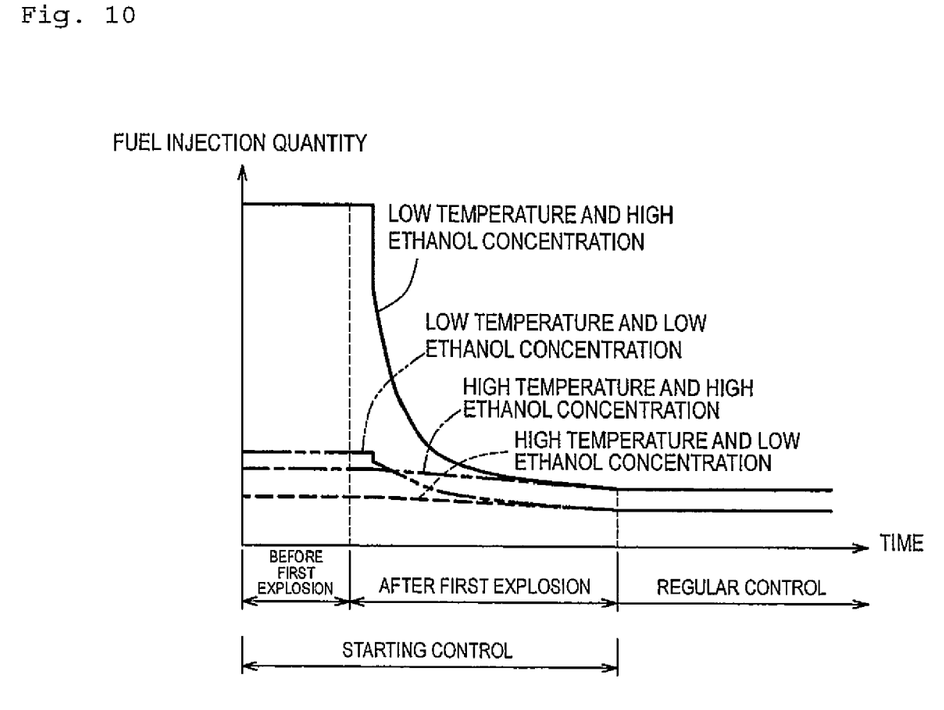
FIG. 10 is a graph illustrating a change in fuel injection quantity in starting control and regular control in accordance with passage of time.

Further, as shown in FIG. 10, the fuel injection quantity before the first explosion is equal to or more than the fuel injection quantity after the first explosion. In particular, the fuel injection quantity after the first explosion is equal to the fuel injection quantity before the first explosion just after the first explosion, and then, decreases to a value less than the fuel injection quantity before the first explosion and gradually falls.

—Regular Control—

The regular control adjusts the injection quantity from fuel injection valve 31 so that the air fuel ratio is a target air fuel ratio. The method of the regular control is not limited at all. Various kinds of control of the air fuel ratio can be properly used. In this embodiment, the mixing ratio of ethanol of the fuel is estimated based on a value detected by $O_2$ sensor 56. Various methods of estimation can be used. In this embodiment, air fuel ratio control is carried out in accordance with the mixing ratio of ethanol.

In the regular control, the fuel injection quantity also varies a little in accordance with a state of driving engine 4. As shown in FIG. 10, however, the fuel injection quantity varies less before and after the first explosion when the mixing ratio of ethanol before the first explosion is high or the temperature of the engine is low. In other words, when the mixing ratio of ethanol before the first explosion is high or the temperature of the engine is low, performing the starting control in accordance with this embodiment increases the fuel injection quantity before and after the first explosion and increases variation of the fuel injection quantity. Accordingly, the startability of engine 4 and warming-up performance are improved.

Advantage of Embodiment

In accordance with this embodiment, bypass passage 26B is provided in intake passage 26 and bypass quantity adjusting mechanism 33 is controlled so that the bypass quantity of engine 4 before the first explosion is lower than the bypass quantity after the first explosion when the mixing ratio of ethanol of the fuel is equal to or more than a predetermined value. Accordingly, the volatility of the fuel is lower when the mixing ratio of ethanol is high. The air fuel ratio, however, is enriched, and the first explosion can thereby be excellently performed. The startability of engine 4 is thus improved and early warming-up can be achieved after the first explosion.

Moreover, in accordance with this embodiment, control is carried out so that the bypass quantity before the first explosion decreases in accordance with an increase in the mixing ratio of ethanol. Accordingly, as the mixing ratio of ethanol increases, the air fuel ratio is enriched more. This improves the startability of engine 4 even when the mixing ratio of ethanol is high.

In addition, in this embodiment, control is carried out so that the lower the temperature of the engine is, the smaller the bypass quantity before the first explosion is. Accordingly, as the temperature of the engine decreases, the air fuel ratio is enriched more. This improves the startability of engine 4 even when the temperature of the engine is low.

Furthermore, in accordance with this embodiment, control is carried out so that the bypass quantity after the first explosion increases in accordance with a decrease in temperature of the engine. Early warming-up is thus achieved even when the temperature of the engine is low.

The relation between the mixing ratio of ethanol and the bypass quantity and the relation between the temperature of the engine and the bypass quantity may or may not be linear relations. The relations may be nonlinear relations. The bypass quantity may change consecutively or stage by stage in accordance with a change in mixing ratio of ethanol or temperature of the engine. Stability in control is improved more in the case of changing the bypass quantity consecutively than in the case of changing the bypass quantity stage by stage. A setting may be employed such that the bypass quantity is changed stage by stage so that the bypass quantity is significantly changed at a state that the mixing ratio of ethanol is around 80% and the temperature of the engine is around 15° C.

Further, in accordance with this embodiment, control is carried out so that the bypass quantity is increased by an increasing quantity equal to or less than a predetermined quantity after the first explosion. In other words, the bypass quantity is gradually increased. This prevents a rapid change in bypass quantity before and after the first explosion, such that starting control is smoothly carried out and warming-up is smoothly performed.

Moreover, in this embodiment, control is carried out so that the fuel injection quantity before the first explosion is equal to or more than the fuel injection quantity after the first explosion. Accordingly, the air fuel ratio is enriched before the first explosion and the startability of engine 4 is improved.

Furthermore, in accordance with this embodiment, control is carried out so that the fuel injection quantity before the first explosion increases in accordance with an increase in the mixing ratio of ethanol. Accordingly, as the mixing ratio of ethanol increases, the air fuel ratio is enriched more. This allows improves the startability of engine 4 even when the mixing ratio of ethanol is high.

In addition, in this embodiment, control is performed so that as the temperature of the engine decreases, the fuel injection quantity before the first explosion increases. Accordingly, the air fuel ration is enriched more at lower engine temperatures. This improves the startability of engine 4 even when the temperature of the engine is low.

<<Modification>>

Ethanol is used as an example of alcohol in the embodiment. However, alcohols other than ethanol such as methanol, for example, may also be used.

In the embodiment as shown by the solid line in FIG. 8, the bypass quantity increases just after the first explosion. However, the bypass quantity may be increased after a predetermined period of time (a period of time of around one second, for example) has passed just after the first explosion.

<<Definition of Terms and Such in the Specification>>

In the specification, "first explosion" means that an ignition plug of engine 4 whose operation is suspended is ignited to carry out an explosion process for the first time and has the same meaning as "starting" of engine 4. Operation of engine 4 is not always continued after the "first explosion" as intended by a driver. That is, contrary to the intention of the driver, the ignition plug is not ignited due to some cause to stop engine 4 in some cases.

The "temperature sensor for detecting the temperature of the internal combustion engine" may directly detect the temperature of the engine or, when the engine is a water cooling type, may indirectly detect the temperature of the engine by detecting the temperature of the cooling water.

INDUSTRIAL APPLICABILITY

The invention is useful for a control device for an internal combustion engine of a straddle type vehicle.

While particular embodiments of the invention have been described, it should be understood that these embodiments are exemplary and not restrictive. Various modifications will be apparent to those of skill in the art and are within the scope of the present invention as set forth in the following claims.

The invention claimed is:

1. A control device for an internal combustion engine including an intake passage having a main flow channel provided with a throttle valve and a bypass flow channel for communicating an upstream side of the throttle valve in the main flow channel with a downstream side of the throttle valve, and a fuel injection valve that injects a mixed fuel formed by mixing gasoline and alcohol, the control device comprising:
- a mixing ratio determining means for detecting or estimating a mixing ratio of alcohol of the fuel;
- a storing means for storing the detected or estimated mixing ratio of alcohol;
- a bypass quantity varying means for varying a bypass quantity of air flowing in the bypass flow channel; and
- a bypass control means for controlling the bypass quantity varying means so that the bypass quantity before a first explosion is less than the bypass quantity after the first explosion when the mixing ratio of alcohol stored in the storing means is a predetermined value or more.

2. The control device according to claim 1, wherein the bypass control means controls the bypass quantity varying means so that the bypass quantity before the first explosion is lowered in accordance with an increase in the mixing ratio of alcohol stored in the storing means.

3. The control device according to claim 1, comprising:
- a temperature sensor for detecting a temperature of the internal combustion engine, wherein
- the bypass control means controls the bypass quantity varying means so that the bypass quantity before the first explosion is lowered in accordance with a decrease in temperature of the internal combustion engine.

4. The control device according to claim 1, comprising:
- a temperature sensor for detecting a temperature of the internal combustion engine, wherein
- the bypass control means controls the bypass quantity varying means so that the bypass quantity after the first explosion increases in accordance with a decrease in temperature of the internal combustion engine.

5. The control device according to claim 1, wherein the bypass control means controls the bypass quantity varying means so that the bypass quantity increases after the first explosion by an increasing quantity equal to or less than a predetermined quantity.

6. The control device according to claim 1, comprising an injection control means for controlling the fuel injection valve so that a fuel injection quantity before the first explosion is equal to or more than a fuel injection quantity after the first explosion.

7. The control device according to claim 6, wherein the injection control means controls the fuel injection valve so that the fuel injection quantity before the first explosion increases in accordance with an increase in the mixing ratio of alcohol stored in the storing means.

8. The control device according to claim 6, comprising:
- a temperature sensor for detecting a temperature of the internal combustion engine, wherein
- the injection control means controls the fuel injection valve so that the fuel injection quantity before the first explosion increases in accordance with a decrease in temperature of the internal combustion engine.

9. A straddle type vehicle comprising the control device according to claim 1.

10. A method for controlling an engine having a bypass flow channel communicating an upstream side of a throttle valve in a main flow channel with a downstream side of the throttle valve, and a fuel injection valve that injects a mixed fuel of gasoline and alcohol, the method comprising:
- detecting or estimating a mixing ratio of alcohol of the fuel;
- varying a bypass quantity of air flowing in the bypass flow channel so that the bypass quantity before a first explosion is less than the bypass quantity after the first explosion when the mixing ratio of alcohol is a predetermined value or more.

11. The method according to claim 10, further comprising lowering the bypass quantity before the first explosion in accordance with an increase in the mixing ratio of alcohol.

12. The method according to claim 10, further comprising:
- detecting a temperature of the engine; and
- lowering the bypass quantity before the first explosion in accordance with a decrease in engine temperature.

13. The method according to claim 10, further comprising:
- detecting a temperature of the engine; and
- increasing the bypass quantity after the first explosion in accordance with a decrease in engine temperature.

14. The method according to claim 10, further comprising increasing the bypass quantity after the first explosion by an increasing quantity equal to or less than a predetermined quantity.

15. The method according to claim 10, further comprising controlling the fuel injection valve so that a fuel injection quantity before the first explosion is equal to or more than a fuel injection quantity after the first explosion.

16. The method according to claim 15, wherein the fuel injection quantity before the first explosion is increased in accordance with an increase in the mixing ratio of alcohol.

17. The method according to claim 15, further comprising:
- detecting a temperature of the engine; and
- controlling the fuel injection valve so that the fuel injection quantity before the first explosion increases in accordance with a decrease in temperature of the internal combustion engine.

* * * * *